US012794841B2

(12) United States Patent
Cosentino et al.

(10) Patent No.: US 12,794,841 B2
(45) Date of Patent: Nov. 10, 2026

(54) CLAIM CHECK MECHANISM FOR A MESSAGE PAYLOAD IN AN ENTERPRISE MESSAGING SYSTEM

(71) Applicant: RED HAT, INC., Raleigh, NC (US)

(72) Inventors: Andrea Cosentino, Rome (IT); Paolo Antinori, Novara (IT)

(73) Assignee: Red Hat, LLC, Raleigh, NC (US)

( * ) Notice: Subject to any disclaimer, the term of this patent is extended or adjusted under 35 U.S.C. 154(b) by 26 days.

(21) Appl. No.: 18/470,928

(22) Filed: Sep. 20, 2023

(65) Prior Publication Data

US 2025/0097181 A1 Mar. 20, 2025

(51) Int. Cl.
*H04L 51/21* (2022.01)
*G06F 9/54* (2006.01)

(52) U.S. Cl.
CPC .............. *H04L 51/21* (2022.05); *G06F 9/546* (2013.01)

(58) Field of Classification Search
CPC .......... G06F 9/54; G06F 9/546; G06F 16/176; G06F 16/1767; G06F 16/774; G06F 16/16; G06F 16/162; G06F 16/174; G06F 16/1748; G06F 16/1774; G06F 13/38; H04L 51/07; H04L 51/08; H04L 51/21; H04L 51/224; H04L 51/234; H04L 67/10; H04L 67/1095; H04L 67/1097
See application file for complete search history.

(56) References Cited

U.S. PATENT DOCUMENTS 6,625,734 B1 * 9/2003 Marvit .................. H04L 51/234
380/278
8,914,344 B1 * 12/2014 Anderson ................ G06F 8/71
707/704
9,406,040 B2 8/2016 Ritter et al.
9,811,525 B1 * 11/2017 Ge ........................ G06F 16/162
10,324,893 B1 * 6/2019 Telang .................. G06F 16/137
10,783,269 B1 * 9/2020 Shraer ................. H04L 67/1097
11,586,460 B2 2/2023 Ibryam
2005/0256931 A1 * 11/2005 Follmeg ................ H04L 51/214
709/206
2005/0283461 A1 * 12/2005 Sell ......................... H04L 51/08
(Continued)

OTHER PUBLICATIONS

Ashiwal, Virendra, and Alois Zoitl. “Messaging interaction patterns for a service bus concept of plc-software.” 2021 26th IEEE International Conference on Emerging Technologies and Factory Automation (ETFA). IEEE, 2021. (Year: 2021).*
(Continued)

*Primary Examiner* — Vivek Srivastava
*Assistant Examiner* — William C Mcbeth
(74) *Attorney, Agent, or Firm* — Dority & Manning, P.A.

(57) ABSTRACT

A method includes storing, by a processing device of an enterprise messaging system comprising a plurality of nodes, a message payload in a data store, wherein the data store is shared by the plurality of nodes, wherein the message payload is extracted from a message; sending, to a first node of the plurality of nodes, a metadata item associated with the message; responsive to determining that a key corresponding to the message payload has been used by the first node to retrieve the message payload, decrementing a removal counter associated with the key; and responsive to determining that the removal counter satisfies a removal threshold criterion, removing the message payload from the data store.

16 Claims, 6 Drawing Sheets

(56) References Cited

U.S. PATENT DOCUMENTS

| | | | | |
|---|---|---|---|---|
| 2006/0136446 | A1* | 6/2006 | Hughes | G06F 16/10 |
| 2007/0056047 | A1* | 3/2007 | Claudator | H04L 63/10 726/28 |
| 2007/0083613 | A1* | 4/2007 | Kuriya | G06Q 30/06 709/217 |
| 2007/0180035 | A1* | 8/2007 | Liu | G06Q 10/107 709/206 |
| 2009/0177751 | A1* | 7/2009 | Ito | H04L 51/08 709/206 |
| 2011/0161680 | A1* | 6/2011 | Grube | G06F 21/6218 713/193 |
| 2011/0167429 | A1* | 7/2011 | Tomita | G06F 9/542 719/313 |
| 2012/0324271 | A1* | 12/2012 | Nigam | H02H 7/262 714/2 |
| 2014/0372486 | A1* | 12/2014 | Bose | G06F 9/546 707/792 |
| 2015/0006475 | A1* | 1/2015 | Guo | G06F 16/1752 707/693 |
| 2015/0254630 | A1* | 9/2015 | Royyuru | G06Q 20/327 705/39 |
| 2017/0270117 | A1* | 9/2017 | Chen | G06F 16/164 |
| 2017/0324618 | A1* | 11/2017 | Lapukhov | H04L 67/1097 |
| 2019/0324763 | A1* | 10/2019 | Devta | H04L 67/10 |
| 2021/0349739 | A1* | 11/2021 | Ritter | G06F 8/10 |
| 2023/0014346 | A1* | 1/2023 | Goyal | G06F 9/546 |

OTHER PUBLICATIONS

Heckman, Rocky. Designing platform independent mobile apps and services. John Wiley & Sons, 2016. pp. 97-111 (Year: 2016).*

Ritter, Daniel, and Jan Sosulski. "Modeling exception flows in integration systems." 2014 IEEE 18th International Enterprise Distributed Object Computing Conference. IEEE, 2014. (Year: 2014).*

Ritter, Daniel, et al. "Optimization strategies for integration pattern compositions." Proceedings of the 12th ACM International Conference on Distributed and Event-Based Systems. 2018. (Year: 2018).*

"Claim-Check Pattern", Microsoft, https://learn.microsoft.com/en-us/azure/architecture/patterns/claim-check, 5 pages.

"Guide to Content Enricher (Message Transformation)", May 22, 2022, https://knowledge.pricefx.com/space/IEKB/4007723319/Guide+to+Content+Enricher+(Message+Transformation), 9 pages.

* cited by examiner

CLAIM CHECK MECHANISM FOR A MESSAGE PAYLOAD IN AN ENTERPRISE MESSAGING SYSTEM

TECHNICAL FIELD

The embodiments of the disclosure relate generally to a computer system and, more specifically, relate to a claim check mechanism for a message payload in an enterprise messaging system.

BACKGROUND

Enterprise application integration (EAI) is an integration framework composed of a collection of technologies and services that form a middleware to enable integration of systems and applications across the enterprise. Many services in the EAI are not under control of an integrator or an architect and, as a result, these services can be overloaded, effectively causing slowdown of a message flow and even leading to a failure of the EAI. The overload in the EAI can be prevented by using a bus as an architecture and peer-to-peer as a communication paradigm. This technique enables every service to act as a loosely-coupled, distributed service on the bus, with the associated benefits of granular fail over and scalability.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
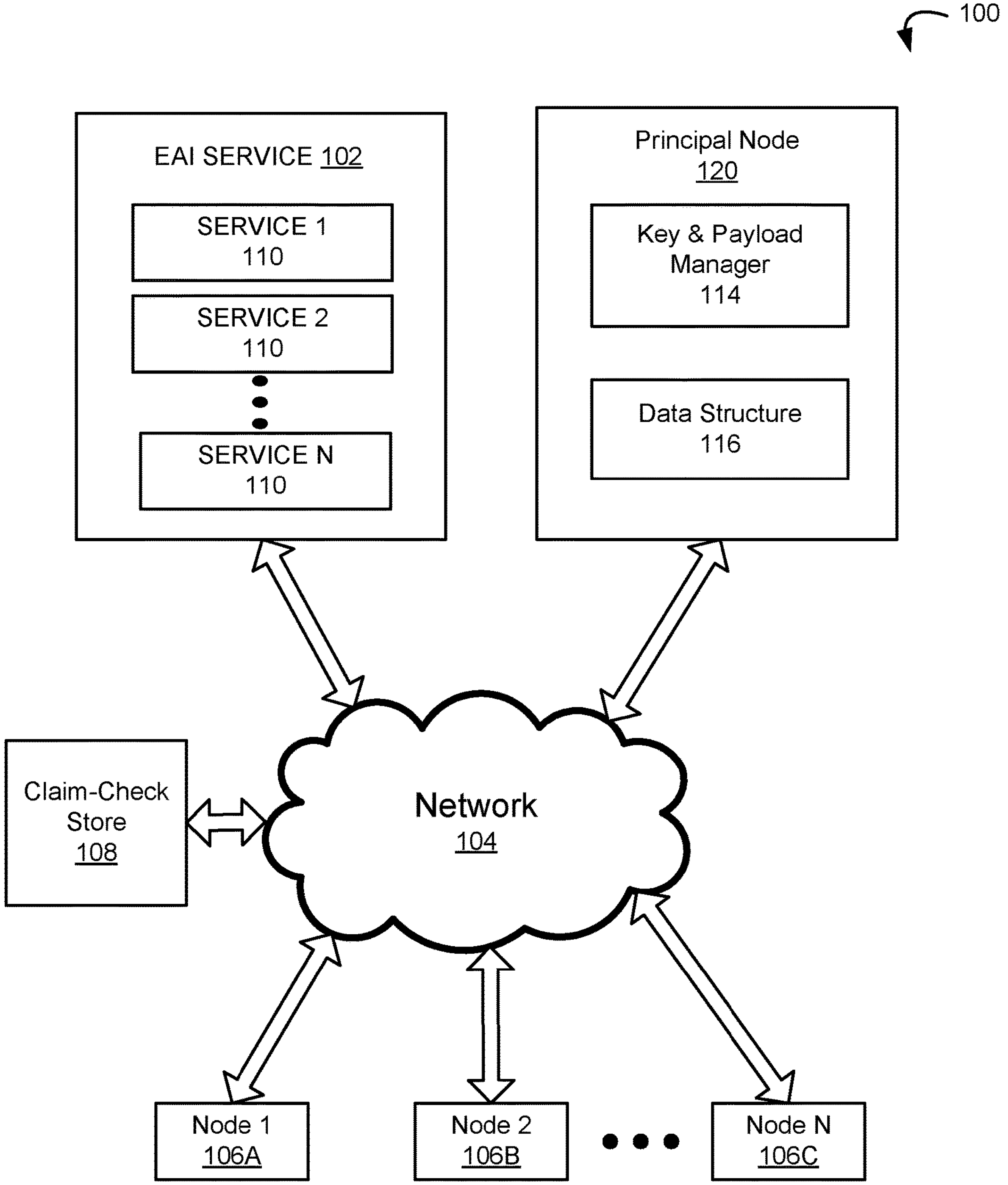
FIG. 1 illustrates an example of a network architecture in which embodiments of the disclosure may operate, in accordance with one or more aspects of the present disclosure.

Described herein are systems and methods for implementing a claim check mechanism for a message payload in an enterprise messaging system. "Claim check" herein refers to an enterprise integration pattern, in which the message payload is stored in a data store ("checked") shared by multiple nodes included in the enterprise messaging system and can be retrieved ("claimed") using a key by the multiple nodes. The enterprise messaging system refers to a messaging system by which the computer systems using the EAI communicate with each other. For example, the enterprise messaging system may use a bus as an architecture and enable every entity to act as a loosely-coupled, distributed entity on the bus. The enterprise messaging system may be facilitated by the use of structured messages (e.g., using XML or JSON) and appropriate protocols (e.g., data distribution service (DDS), advanced message queuing protocol (AMQP)).

In some implementations, an enterprise messaging system can include multiple nodes exchanging messages. In some cases, a message may contain a large amount of data that does not need to be carried along the transmission route, for example, when the transmission route involves multiple nodes but only the destination node requires the data. Carrying the data through each processing step of the transmission route may cause performance degradation and make debugging harder because of extra data. To solve the problem, a component of the system may store these data in a persistent data store, generate a key ("claim check") that can be used to "claim" (retrieve) the data from the persistent data store, associate the message with the key, and transmit the message without the data. When a node receiving the message needs to retrieve the data that is not included in the message, the node can use the key to "claim" (retrieve) the data from the persistent data store. In some implementations, multiple nodes may need to retrieve the same data associated with a message, which can make the above-described retrieval process inefficient. In some implementations, for example, in an Internet of Things (IoT) or edge computing environment with limited resources (e.g., central processing unit (CPU), memory, storage, input/output (I/O) bandwidth) and/or energy, the same data associated with a message may be stored multiple times because each node may perform separately the above-described claim check process on a same message, thus placing pressure on the limited resources and energy.

Aspects of the present disclosure address the above-noted and other deficiencies by providing technology that implements a claim check mechanism for a message payload in an enterprise messaging system. A node in the enterprise messaging system may provide an execution environment for an application. The execution environment may include a virtual machine or container that is hosted on a physical machine, or may be implemented as part of a clustered compute environment. Specifically, a principal node (or any node in the enterprise messaging system) in the enterprise messaging system can determine that a message payload does not need to be transmitted along a message transmission route of a message and extract such message payload from the message. The principal node may store the message payload in a data store, where the data store is shared by multiple nodes in the enterprise messaging system. The principal node may generate a unique key and associate the key with the message payload (e.g., by a record including a key and an identifier of the corresponding message payload). The principal node may transmit the message without the message payload by transmitting a metadata item associated with the message. The metadata item may include an attribute of the message including, for example, a sender identifier, a receiver identifier, a category, a topic, etc. The metadata item may include part of a header of the message. The metadata item may include information identifying the key (e.g., an address referencing a location of the key, or an identifier of the message payload) to the message. The metadata item associated with the message may then be used instead of the original message in the following message transmission. In some implementations, the message payload contains an amount of data exceeding a threshold value, while the metadata item contains an amount of data that is smaller than the amount of the data in the message payload, and as such, the following transmitted data is in a smaller size compared to the original message. Therefore, the message payload is "checked" (stored in a data store) and can be "claimed" (retrieved) by using the key, which can be referred to as the claim check mechanism.

The principal node can maintain, in its memory, a data structure (e.g., a key lookup data structure) to store the key. A node of the enterprise messaging system, when attempting to retrieve the message payload in the message, can use the information identifying the key attached to the message to have the principal node to search the data structure to obtain a key. For example, the data structure can include multiple records, such that each record can include information identifying a particular message payload (e.g., an identifier of message payload) and a field specifying the key associated with the particular message payload. A node may use the metadata item associated with the message to locate the data structure and search the data structure for a record corresponding to the key.

In some implementations, the principal node may compress the key, for example, by applying a string compressing algorithm. The principal node may store, in the data structure, the compressed version of key. This can further reduce the memory size used for storing the key.

In some implementations, the principal node can maintain a removal counter for a key associated with a message payload. The principal node can assign a value to the removal counter, where the removal counter value represents the available number of times of retrieval of a key by the nodes in the enterprise messaging system. In some implementations, the principal node can store the removal counter value in a dedicated field of the key lookup data structure, along with the key and an identifier of the message payload. The principal node may receive a payload retrieval request from a node, and in response, search the data structure for the key. The principal node may obtain the key in the data structure and send the key to the requesting node. The principal node may decrement the removal counter value of the key (e.g., by 1). The principal node may determine whether the removal counter value of the key satisfies a removal threshold criterion, which defines the criterion to remove the message payload from the data store. Responsive to determining that the removal counter value of the key satisfies the removal threshold criterion, the principal node may trigger a process to remove the message payload from the data store. For example, the removal threshold criterion may specify a threshold value (e.g., 0) and a time period (e.g., 60 seconds), and when the removal counter value of the key reaches the threshold value (e.g., decrementing to 0) for the time period (e.g., 60 seconds), the principal node may determine that the removal counter value of the key satisfies the removal threshold criterion and trigger the removal process to remove the message payload from the data store.

In some implementations, the removal process may involve placing an identifier of the message payload in a removal candidate pool, from which the message payloads may be selected by the principal node based on a chosen removal policy, such as a least recently used (LRU) rule, a least frequently used (LFU) rule, or a first-in-first-out (FIFO) rule. The selected message payload will be then removed from the data store. Therefore, the message payload to be removed may be the message payload that has triggered the removal process (without using the removal candidate pool), or the message payload selected from the removal candidate pool.

In some implementations, triggering the removal process may involve removing the message payload immediately. In some implementations, triggering the removal process may involve monitoring the memory pressure of the data store and removing the message payload when the memory pressure satisfies a threshold creation (e.g., the available memory is below a threshold size). In some implementations, triggering the removal process may involve monitoring the fetch status of the message payload(s) to be stored in the data store, and removing the message payload when the fetch status satisfies a threshold creation (e.g., the number of message payloads waiting in a queue exceeds a threshold number).

In some implementations, the principal node can maintain a borrow counter for a key associated with a message payload. The borrow counter value represents the available number of concurrent-borrowing of a key by the nodes in the enterprise messaging system. This may be useful in a situation where the available resources are limited in the messaging system, and by using the borrow counter, the system can control the maximum number of concurrent usage of a message payload. In some implementations, the principal node can store the borrow counter value in a dedicated field of the key lookup data structure, along with the key and an identifier of the message payload. The principal node may receive a borrowing request from a node, and in response, search in the data structure for a key. The principal node may find a key from the data structure, send the requesting node the key for borrowing, and decrement the borrow counter value of the key (e.g., by 1). In such cases, the principal node does not trigger a process of removing the message payload, and does not remove the message payload but only controls the concurrent borrowing of the message payload. When a node returns a borrowed key to the data structure, for example, by sending a message indicating the node has stopped using the message payload, the principal node increments the borrow counter value of the key (e.g., by 1). The principal node may determine whether the borrow counter value of the key satisfies a borrow threshold criterion, which defines a criterion stop lending the key to a node. Responsive to determining that the borrow counter value of the key satisfies a borrow threshold criterion, the principal node may render the key unavailable in the data structure. For example, the borrow threshold criterion may specify a threshold value (e.g., 0), and when the borrow counter value of the key reaches the threshold value (e.g., decrementing to 0), the principal node may determine that the borrow counter value of the key satisfies the borrow threshold criterion and render the key unavailable. Thereafter, when the principal node receives a borrowing request from another node, the principal node may provide, to this node, an estimated time of the availability of the key, i.e., when at least one node returns the key. In some implementations, the time duration in which a node can borrow a key may be predefined, and the principal node can estimate time of the availability of the key accordingly. In some implementations, the node that has borrowed the key may provide an estimated time for returning the key, and the principal node can estimate time of the availability of the key accordingly.

Aspects of the present disclosure present advantages of providing optimized consumption of resources and energy in an environment with limited resources and energy. By maintaining a data structure for a key lookup, the present disclosure can manage and coordinate the resources and energy consumed by multiple nodes associated with the message payload. Aspects of the present disclosure also enhances the processing efficiency and avoiding duplicated data storage associated with a message payload that may be shared by multiple nodes.

FIG. 1 illustrates an example of a network architecture 100 in which embodiments of the present disclosure may operate. The network architecture 100 may include an Enterprise Application Integration (EAI) service 102, a network 104, and multiple nodes. A node may be computing devices such as, for example, desktop computers, personal computers (PCs), server computers, mobile phones, palm-sized computing devices, personal digital assistants (PDAs), tablet devices, and so on. In some implementations, a "node" providing computing functionality may provide the execution environment for an application, may include a virtual machine or container that is hosted on a physical machine, or may be implemented as part of in a clustered compute environment ("cloud"). In some implementations, a node may be a client with respect to the EAI service 102, but may be a server device of an enterprise. In some implementations, the network architecture 100 may be an enterprise messaging system.

The nodes are communicably coupled to the EAI service 102 via the network 104. Network 104 may be a public network (e.g., Internet) or a private network (e.g., Ethernet or a local area Network (LAN)). In some implementations, the nodes interact with the EAI 102 by exchanging messages via standard protocols including, for example, File Transfer Protocol (FTP) and Hypertext Transfer Protocol (HTTP). Each node may run client applications to generate messages that are processed by the EAI service 102. A message is any type of communication received by the EAI service 102, processed within the EAI service 102 and sent back to the nodes.

In some implementations, the EAI service 102 includes one or more services 110. In some implementations, the services 110 represent non-iterative and autonomously-executing programs that communicate with other services through message exchange. The EAI service 102 may also execute the one or more services 110 (e.g., by calling one or more methods contained in a code that implements the services 110) to process the messages. The services of each service 110 may include system services such as invocation support, mediation, messaging, process choreography, service orchestration, complex event processing, security (encryption and signing), reliable delivery, transaction management, management (e.g., monitoring, audit, logging, metering), and user defined services. Although, the term "EAI Service" is used in the description, embodiments described herein may also be applied to any service that provides a deployed service to a client that communicates with the service by messages. In one embodiment, the services represent non-iterative and autonomously-executing programs that communicate with other services through message exchange.

In some implementations, the nodes may include a principal node 120 and nodes 1-N 106A-C. The principal node 120 may include a key and payload manager 114. In some implementations, the key and payload manager 114 can extract, from an original message, a message payload that can be stored in a data store without being transmitted through a bus to a destination node and can be retrieved later by the destination node. In some implementations, the key and payload manager 114 may store the message payload in a claim-check store 108. The claim-check store 108 is a data store that can store message payloads and can be accessed by nodes 1-N 106A-C for retrieving message payloads. The key and payload manager 114 may generate a key and associate the key to a message payload, where the key can be used by nodes 1-N 106A-C for claiming the message payload stored in the claim-check store 108.

In some implementations, the key and payload manager 114 can transmit the message without the message payload by using a metadata item associated with the message, where the metadata item, instead of the original message, will be used in the message transmission. The metadata item may include an attribute of the message including, for example, a sender identifier, a receiver identifier, a category, a topic, etc. The metadata item may include part of a header of the message. The metadata item may include information identifying the key (e.g., an address referencing a location of the key, or an identifier of the message payload) to the message.

In some implementations, the key and payload manager 114 can maintain a data structure 116 for storing the key associated with the message payload. The data structure 116 may include a set of records, where each record includes a field of identifying a message payload (e.g., an identifier of message payload) and a field of specifying a corresponding key associated with the message payload. A node may use the metadata item associated with the message to locate the data structure and search the data structure for a record corresponding to the key.

In some implementations, the key and payload manager 114 can compress the key, for example, through a string compression algorithm and store the compressed key, instead of the original key, in the data structure 116.

In some implementations, the key and payload manager 114 can maintain a removal counter for each key and store a corresponding removal counter value of the key in the data structure 116. The removal counter value can represent the available times that a key can be used to retrieve the message payload by the nodes 1-N 106A-106C. The removal counter value can be initialized with a pre-configured (default) or dynamically computed value. For example, the removal counter value associated with key A is X, which means that the key A can be used for X times to retrieve the message payload corresponding to the key A, regardless of which node uses the key A; after the key A has been retrieved for X times, the corresponding message payload is to be removed from the claims-check store 108.

In some implementations, the key and payload manager 114 can receive, from a node (e.g., node 1-N 106A-C), a request of retrieving a key. In some implementations, the request may include a flag indicating that a key is to be obtained without returning, and the request may contain information regarding how to find the key, for example, an identifier of the message payload and an address referencing a location of the key lookup data structure. The key retrieval refers to the process that a node uses the key to retrieve the message payload but will not return the key. The key and payload manager 114 can search the data structure for a record matching the information specified in the request. Upon finding a matched record in the data structure, the key and payload manager 114 can send the information of the matched record (e.g., the address of the message payload) to the requesting node, and decrement the removal counter value of the key by 1. In some implementations, the key and payload manager 114 can determine whether the removal counter value satisfies a removal threshold criterion, and responsive to determining that the counter value satisfies the threshold removal criterion, the key and payload manager 114 can trigger a process for removing the message payload. In one implementation, the removal threshold criterion specifies a threshold value and a predefined timeout period. For example, the key and payload manager 114 can determine whether the removal counter value reaches the threshold value (e.g., 0) for the predefined timeout period (e.g., 60 seconds).

In one implementation, a process for removing the message payload involves placing an identifier of the message payload into a removal candidate pool, and select, from the removal candidate pool, a specific message payload based on a removal policy. The removal policy may include a least recently used (LRU) rule, a least frequently used (LFU) rule, or a first-in-first-out (FIFO) rule. The selected message payload will be then removed from the data store. Therefore, the message payload to be removed may be the message payload that has triggered the removal process (without using the removal candidate pool), or the message payload selected from the removal candidate pool.

In one implementation, triggering a process for removing the message payload may involve removing the message payload immediately. In some implementations, triggering a process for removing the message payload may involve monitoring the memory pressure of the data store or monitoring the fetch status of the message payload(s) to be stored in the data store, and removing the message payload when the message pressure satisfies a threshold creation (e.g., the available memory is below a threshold size) or the fetch status satisfies a threshold creation (e.g., the number of message payloads waiting in a queue exceeds a threshold number).

In some implementations, the key and payload manager 114 can maintain a borrow counter for each key and store a corresponding borrow counter value associated with the key in the data structure 116. The borrow counter value can represent the available number by which a key can be concurrently borrowed to retrieve a message payload by the nodes 1-N 106A-106C. The borrow counter value can be initialized with a pre-configured (default) or dynamically computed value. For example, the borrow counter value associated with key B is Y, and the key B can be borrowed Y times concurrently to retrieve the message payload corresponding to the key B, regardless of which node borrows the key B; when the key B has been borrowed for Y times, the key B is rendered unavailable in the data structure 116.

In some implementations, the key and payload manager 114 can receive, from a node (e.g., node 1-N 106A-C), a request of borrowing a key. In some implementations, the request may include a flag indicating that a key is to be obtained with returning, and the request may contain information regarding how to find the key, for example, an identifier of the message payload and an address referencing a location of the key lookup data structure. The key borrowing refers to the process that a node borrows the key to retrieve the message payload but will return the key after a time period. The key and payload manager 114 can search the data structure for a record matching the information specified in the request. Upon finding a matched record in the data structure, the key and payload manager 114 can send the information of the matched record (e.g., the address of the message payload) to the requesting node, and decrement the borrow counter value of the key by 1. In some implementations, the key and payload manager 114 can detect a key returning (e.g., by receiving, from a node, a notification indicating that a key and/or the corresponding message payload is no longer used by the node), and increment the borrow counter value of the key by 1. In some implementations, the key and payload manager 114 can determine whether the borrow counter value satisfies a borrow threshold criterion, and responsive to determining that the borrow counter value satisfies the borrow threshold criterion, the key and payload manager 114 can render the message payload unavailable and notify the future borrower that the key is temporarily unavailable. In such borrowing cases, the principal node does not trigger a process of removing the message payload. In one implementation, the threshold removal criterion specifies a threshold value. For example, the key and payload manager 114 can determine whether the borrow counter value reaches the threshold value (e.g., 0), and when the borrow counter value of the key reaches the threshold value (e.g., decrementing to 0), the key and payload manager 114 may determine that the borrow counter value of the key satisfies the borrow threshold criterion and render the key unavailable.

In some implementations, when the key is rendered unavailable, the key and payload manager 114 can receive a borrowing request from another node, and provide, to this node, an estimated time of the availability of the key, i.e., when at least one node returns the key. In some implementations, the time duration in which a node can borrow a key may be predefined, and the key and payload manager 114 can estimate time of the availability of the key accordingly. In some implementations, the node that has borrowed the key may provide an estimated time for returning the key, and the key and payload manager 114 can estimate time of the availability of the key accordingly.

Figure 2:
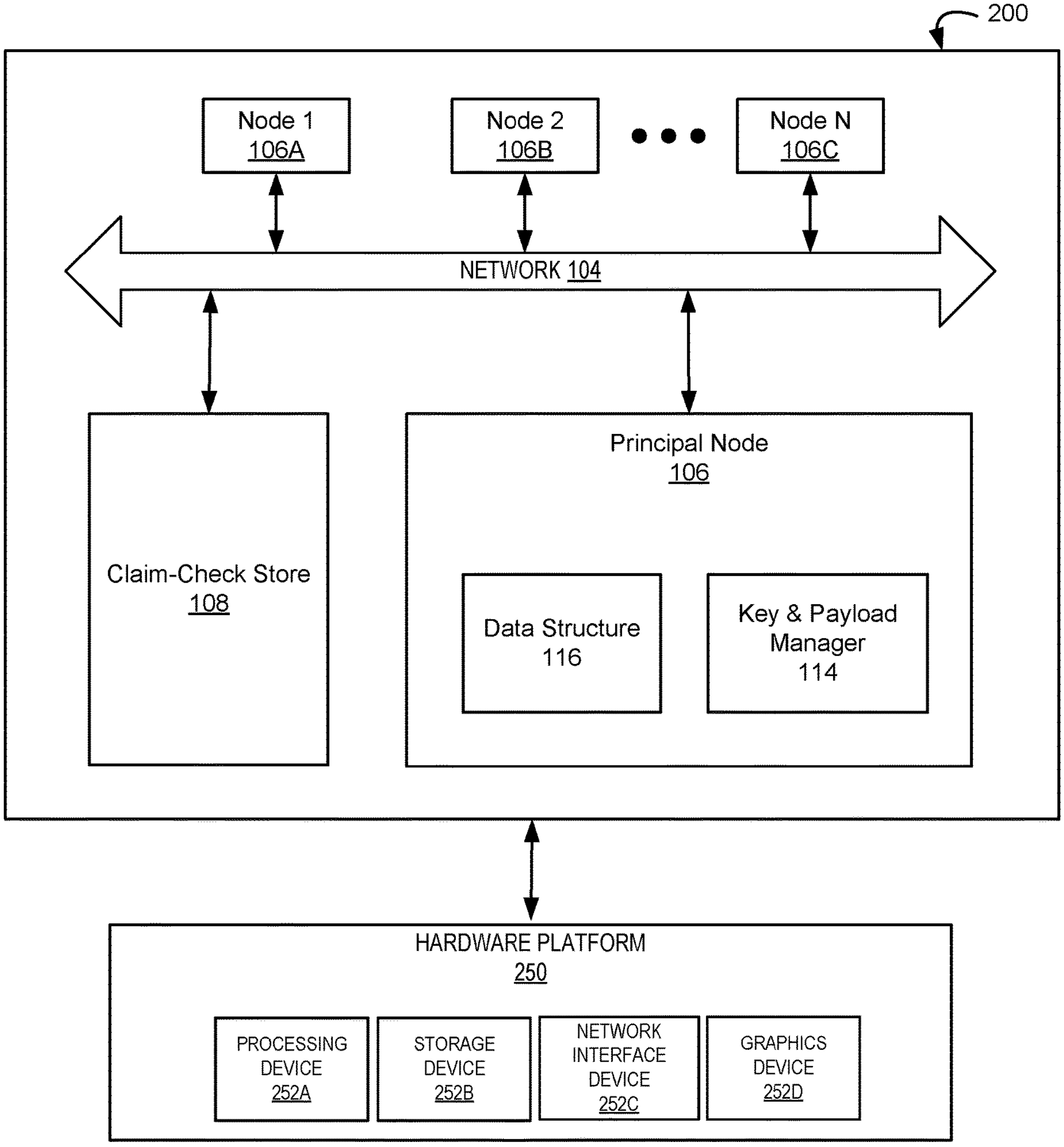
FIG. 2 is a block diagram of one embodiment of implementing a claim check mechanism for a message payload in an enterprise messaging system including multiple nodes, in accordance with one or more aspects of the present disclosure.

FIG. 2 is a block diagram of an example of implementing a claim check mechanism for a message payload in an enterprise messaging system including multiple nodes according to an embodiment of the disclosure. In one embodiment, a system 200 is the same as the network architecture 100 described with respect to FIG. 1. In one embodiment, the system 200 is an enterprise messaging system that includes a computing machine such as, for example, a server computer, a gateway computer or any other suitable computer system that is configurable for operating as an enterprise messaging system. As illustrated in FIG. 2, the system 200 may include a hardware platform 250, on top of which runs an enterprise messaging system that executes functionality of the enterprise messaging system.

The hardware platform 250 may provide hardware resources and functionality for performing computing tasks. Hardware platform 250 may include one or more processing devices 252A, one or more storage devices 252B, one or more network interface devices 252C, one or more graphic device 252D, other computing devices, or a combination thereof. One or more of hardware devices may be split up into multiple separate devices or consolidated into one or more hardware devices. Some of the hardware device shown may be absent from hardware platform 250 and may instead be partially or completely emulated by executable code.

Processing devices 252A may include one or more processors that are capable of executing the computing tasks. Processing devices 252A may be a single core processor that is capable of executing one instruction at a time (e.g., single pipeline of instructions) or may be a multi-core processor that simultaneously executes multiple instructions. The instructions may encode arithmetic, logical, or I/O operations. In one example, processing devices 252A may be implemented as a single integrated circuit, two or more integrated circuits, or may be a component of a multi-chip module (e.g., in which individual microprocessor dies are included in a single integrated circuit package and hence share a single socket). A processing device may also be referred to as a central processing unit ("CPU").

Storage devices 252B may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, storage devices 252B may be physical memory and may include volatile memory devices (e.g., random access memory (RAM)), non-volatile memory devices (e.g., flash memory, NVRAM), and/or other types of memory devices. In another example, storage devices 252B may include one or more mass storage devices, such as hard drives, solid state drives (SSD)), other data storage devices, or a combination thereof. In a further example, storage devices 252B may include a combination of one or more memory devices, one or more mass storage devices, other data storage devices, or a combination thereof, which may or may not be arranged in a cache hierarchy with multiple levels.

Network interface device 252C may provide access to a network internal to the system 200 or external to the system 200 (e.g., a network) and in one example may be a network interface controller (NIC). Graphics device 152D may provide graphics processing for the system 200 and/or one or more of the virtual machines. One or more of the hardware devices may be combined or consolidated into one or more physical devices or may partially or completely emulated by hypervisor as a virtual device. The hardware platform 250 may also include additional hardware devices, such as sound or video adaptors, photo/video cameras, printer devices, keyboards, displays or any other suitable device intended to be coupled to a computer system.

In the example of FIG. 2, the system 200 share the resources of the hardware platform 250. The claim-check store 108 and the data structure 116 each can have limited size for storage. In one example, the system 200 includes a wireless sensor network, where each node 1-N includes a sensor. The sensors share the limited resources and limited energy constrained by the hardware platform 250. By using the method described above, the sensors can retrieve the same message payload using a key without storing duplicates of the message payload in the claim-check store 108. The message payload can be removed from the claim-check store 108 after a certain number of the sensors has retrieved the message payload. The removal of message payload can be performed according to status of the available resources and available energy in the system 200. The message payload can be kept in the claim-check store 108 while the number of the sensors that can access the message payload concurrently is under the control.

Figure 3:
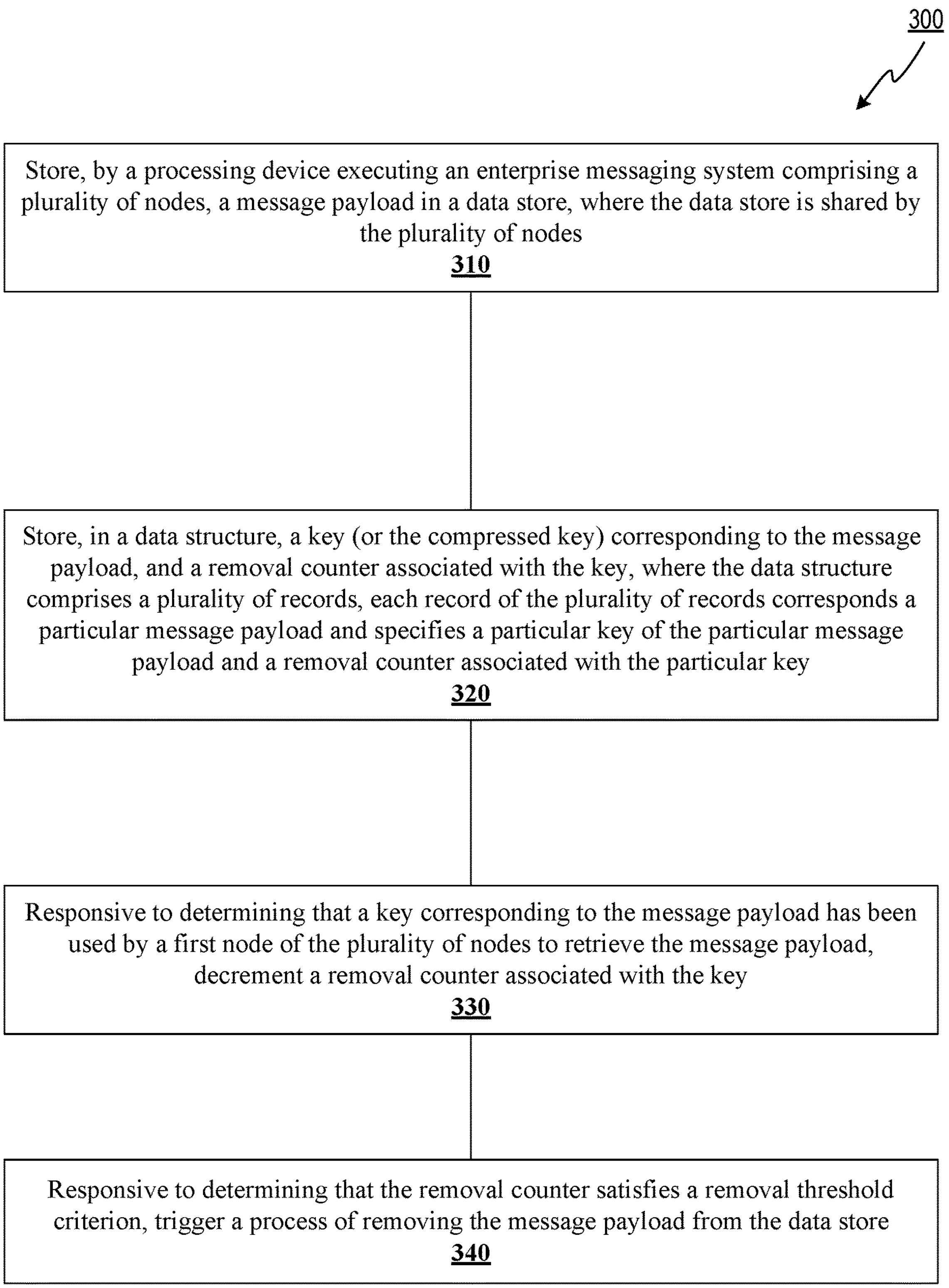
FIG. 3 is a flow diagram of an example method for implementing a claim check mechanism for a message payload in an enterprise messaging system including multiple nodes, in accordance with one or more aspects of the present disclosure.
Figure 4:
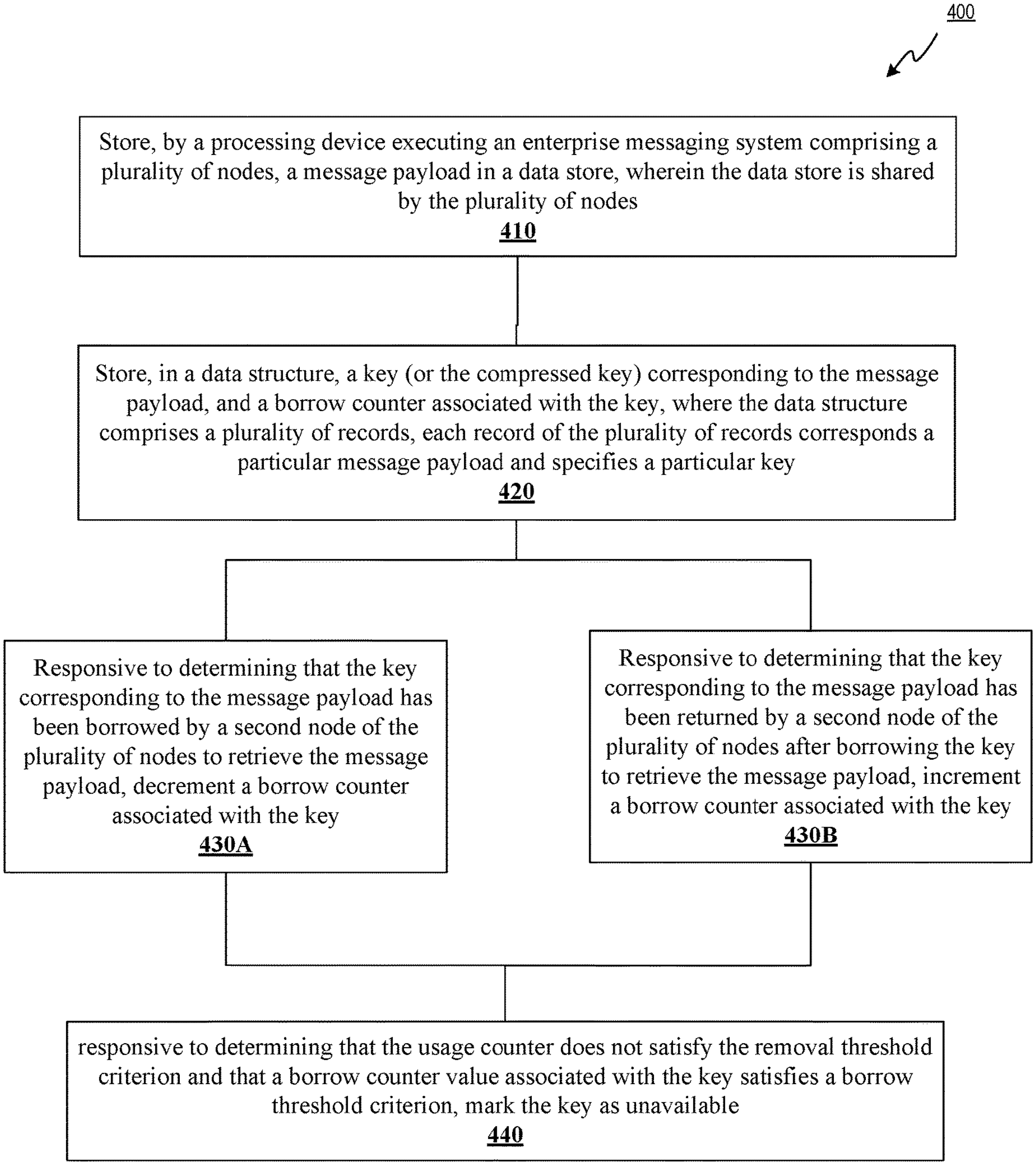
FIG. 4 is a flow diagram of another example method for implementing a claim check mechanism for a message payload in an enterprise messaging system including multiple nodes, in accordance with one or more aspects of the present disclosure.

FIGS. 3 and 4 are flow diagrams illustrating methods 300 and 400 for implementing a claim check mechanism for a message payload in an enterprise messaging system including multiple nodes according to an embodiment of the present disclosure. Methods 300 and 400 each of its individual functions, routines, subroutines, or operations may be performed by one or more processors of the computer device executing the method. In certain implementations, methods 300 and 400 may be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Methods 300 and 400 may be performed by processing logic that may comprise hardware (e.g., circuitry, dedicated logic, programmable logic, microcode, etc.), software (such as instructions run on a processing device), firmware, or a combination thereof. In one embodiment, methods 300 and 400 are performed by the key and payload manager 114 of FIGS. 1 and 2. In one implementation, methods 300 and 400 may be performed by a kernel of a hypervisor or by an executable code of a host machine (e.g., host operating system or firmware), a virtual machine (e.g., guest operating system or virtual firmware), an external device (e.g., a PCI device), other executable code, or a combination thereof.

Referring to FIG. 3, at operation 310, the processing device executing an enterprise messaging system comprising a plurality of nodes may store a message payload in a data store, where the data store is shared by the plurality of nodes.

In some implementations, the processing device may extract, from a message, a message payload that is not necessarily to be transmitted along a message transmission route. The processing device may generate a unique key and associated the key with the message payload. The processing device may send, to a first node of the plurality of nodes, a metadata item associated with the message. In some implementations, the message payload contains an amount of data exceeding a first threshold value, while metadata item contains an amount of data below a second threshold value (that is smaller than the first threshold value), and as such, the metadata item is in a smaller size compared to the original message. In some implementations, the processing device may send, to a first node of the plurality of nodes, the message without the message payload.

At operation 320, the processing device may store, in a data structure, a key (or the compressed key) corresponding to the message payload, and a removal counter value associated with the key, wherein the data structure comprises a plurality of records, each record of the plurality of records corresponds a particular message payload (e.g., by including a field specifying an identifier of the message payload) and includes a field specifying a particular key of the particular message payload and a field specifying a removal counter value associated with the particular key.

In some implementations, the processing device may receive, from the first node, a request to retrieve the message payload, identify the key corresponding to the message payload, and send the key to the first node.

In some implementations, the processing device may maintain a removal counter for a key associated with a message payload. The processing device may assign a value to the removal counter, where the removal counter value represents the available number of times of retrieval of the key by the nodes in the enterprise messaging system.

At operation 330, responsive to determining that a key corresponding to the message payload has been used by a first node of the plurality of nodes to retrieve the message payload, the processing device may decrement a removal counter value associated with the key.

At operation 340, responsive to determining that the removal counter value satisfies a removal threshold criterion, the processing device may trigger a process of removing the message payload from the data store.

In some implementations, the processing device may trigger the process of removing the message payload from the data store by placing an identifier of the message payload in a candidate pool, selecting a first message payload from the candidate pool, and removing the first message payload from the data store. The processing device may select the first message payload from the removal pool according to at least one of strategies: a least recently used (LRU) rule, a least frequently used (LFU) rule, or a first-in-first-out (FIFO) rule. The processing device may remove the message payload from the data store, responsive to detecting a triggering event, where the triggering event comprises at least one of: a resource of the data store satisfying a threshold criterion, or a queue associated with the data store satisfying a threshold criterion.

Referring to FIG. 4, at operation 410, the processing device executing an enterprise messaging system comprising a plurality of nodes may store a message payload in a data store, where the data store is shared by the plurality of nodes.

At operation 420, the processing device may store, in a data structure, a key (or the compressed key) corresponding to the message payload, and a borrow counter value associated with the key, where the data structure comprises a plurality of records, each record of the plurality of records corresponds a particular message payload (e.g., by including a field specifying an identifier of the message payload) and includes a field specifying a particular key of the particular message payload and a field specifying a borrow counter value associated with the particular key. The borrow counter value represents the available number of concurrent-borrowing of the key by the plurality of nodes in the enterprise messaging system.

At operation 430A, responsive to determining that the key corresponding to the message payload has been borrowed by a second node of the plurality of nodes to retrieve the message payload, the processing device may decrement a borrow counter value associated with the key. At operation 430B, responsive to determining that the key corresponding to the message payload has been released by a second node of the plurality of nodes after borrowing the key to retrieve the message payload, the processing device may increment a borrow counter value associated with the key.

At operation 440, responsive to determining that the removal counter value does not satisfy the removal threshold criterion and that a borrow counter value associated with the key satisfies a borrow threshold criterion, the processing device may render the key unavailable.

In some implementations, the processing device may, responsive to determining that the removal counter value does not satisfy the removal threshold criterion and that a borrow counter value associated with the key satisfies a borrow threshold criterion, render the key unavailable. In some implementations, the processing device may provide an estimated time of availability of the key.

Figure 5:
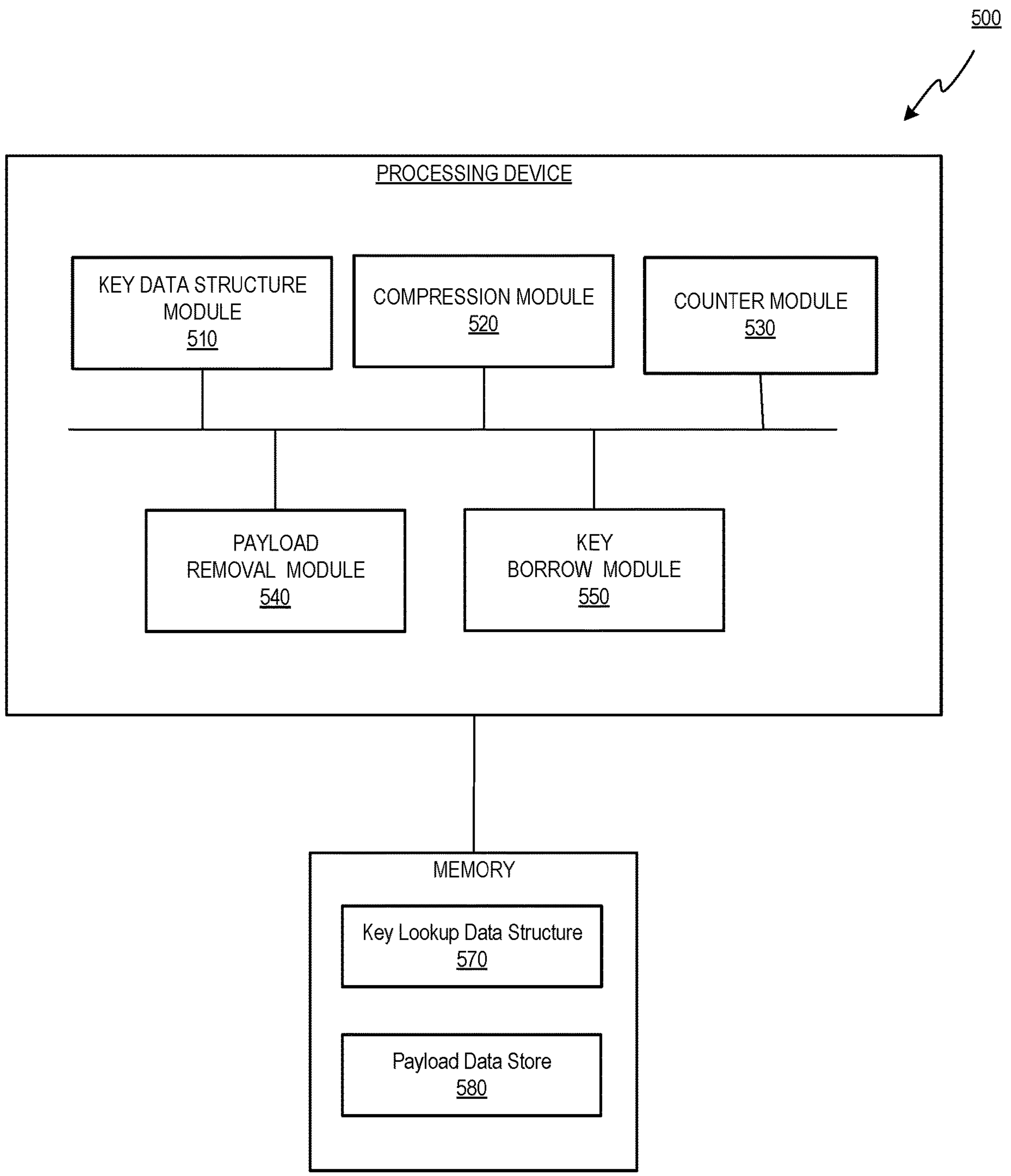
FIG. 5 depicts a block diagram of an example computer system in accordance with one or more aspects of the present disclosure, in accordance with one or more aspects of the present disclosure.

FIG. 5 depicts a block diagram of a computer system 500 operating in accordance with one or more aspects of the present disclosure. Computer system 500 may be the same or similar to computing system 100 of FIG. 1, or computing system 200 of FIG. 2, and may include one or more processors and one or more memory devices. In the example shown, computer system 500 may include a key data structure module 510, a compression module 520, a counter module 530, a payload removal module 540, a payload borrow module 550, and a memory including a key lookup data structure 570 and a payload data store 580.

Key data structure module 510 may enable a processor to maintain a data structure 570, where the data structure comprises a plurality of records, each record of the plurality of records corresponds a particular message payload and specifies a particular key (a key or compressed key) of the particular message payload and a removal counter value associated with the particular key. Key data structure module 510 may enable a processor to maintain a data structure 570, where the data structure comprises a plurality of records, each record of the plurality of records corresponds a particular message payload and specifies a particular key (a key or compressed key) of the particular message payload and a borrow counter value associated with the particular key. Key data structure module 510 may enable a processor to maintain a data structure 570 including both the removal counter value and the borrow counter value.

Compression module 520 may enable a processor to compress the key, for example, through a string compression algorithm and store the compressed key, instead of the original key, in the data structure 570.

Counter module 530 may enable a processor to configure a removal counter for a key associated with a message payload. Counter module 530 can enable a processor to assign a value to the removal counter, where the removal counter value represents the available number of times of retrieval of a key. The Counter module 530 can decrement the removal counter value of the key (e.g., by 1) upon the key has been retrieved by a node. Counter module 530 may enable a processor to configure a borrow counter for a key associated with a message payload. The principal node can assign a value to the borrow counter, where the borrow counter value represents the available number of concurrent-borrowing of a key. The Counter module 530 can decrement the borrow counter value of the key (e.g., by 1) upon the key has been borrowed by a node and increment the borrow counter value of the key (e.g., by 1) upon a borrowed key has been returned by a node.

Payload removal module 540 may enable the processor to determine whether the removal counter value of the key satisfies a removal threshold criterion. Responsive to determining that the removal counter value of the key satisfies a removal threshold criterion, the payload removal module 540 may trigger a process to remove the message payload from the data store 580.

In some implementations, the payload removal module 540 may place the message payload in a removal candidate pool, select a message payload in the removal candidates pool according to a policy, such as a least recently used (LRU) rule, a least frequently used (LFU) rule, or a first-in-first-out (FIFO) rule.

In some implementations, the payload removal module 540 may remove the message payload (e.g., the message payload that has triggered the removal process, or the message payload selected from the removal candidate pool) immediately. In some implementations, the payload removal module 540 may monitor the memory pressure of the data store or monitor the fetch status of the message payload(s) to be stored in the data store, and remove the message payload (e.g., the message payload that has triggered the removal process, or the message payload selected from the removal candidate pool) when the message pressure satisfies a threshold creation (e.g., the available memory is below a threshold size) or the fetch status satisfies a threshold creation (e.g., the number of message payloads waiting in a queue exceeds a threshold number).

Key borrow module 550 may enable the processor to determine whether the borrow counter value of the key satisfies a borrow threshold criterion. Responsive to determining that the borrow counter value of the key satisfies a borrow threshold criterion, the key borrow module 550 may mark the key as unavailable in the data structure. The key borrow module 550 may provide an estimated time of the availability of the key, i.e., when at least one node returns the key. In some implementations, the time duration in which a node can borrow a key may be predefined, and the key borrow module 550 can estimate time of the availability of the key accordingly. In some implementations, the node that has borrowed the key may provide an estimated time for returning the key, and the key borrow module 550 can estimate time of the availability of the key accordingly.

Figure 6:
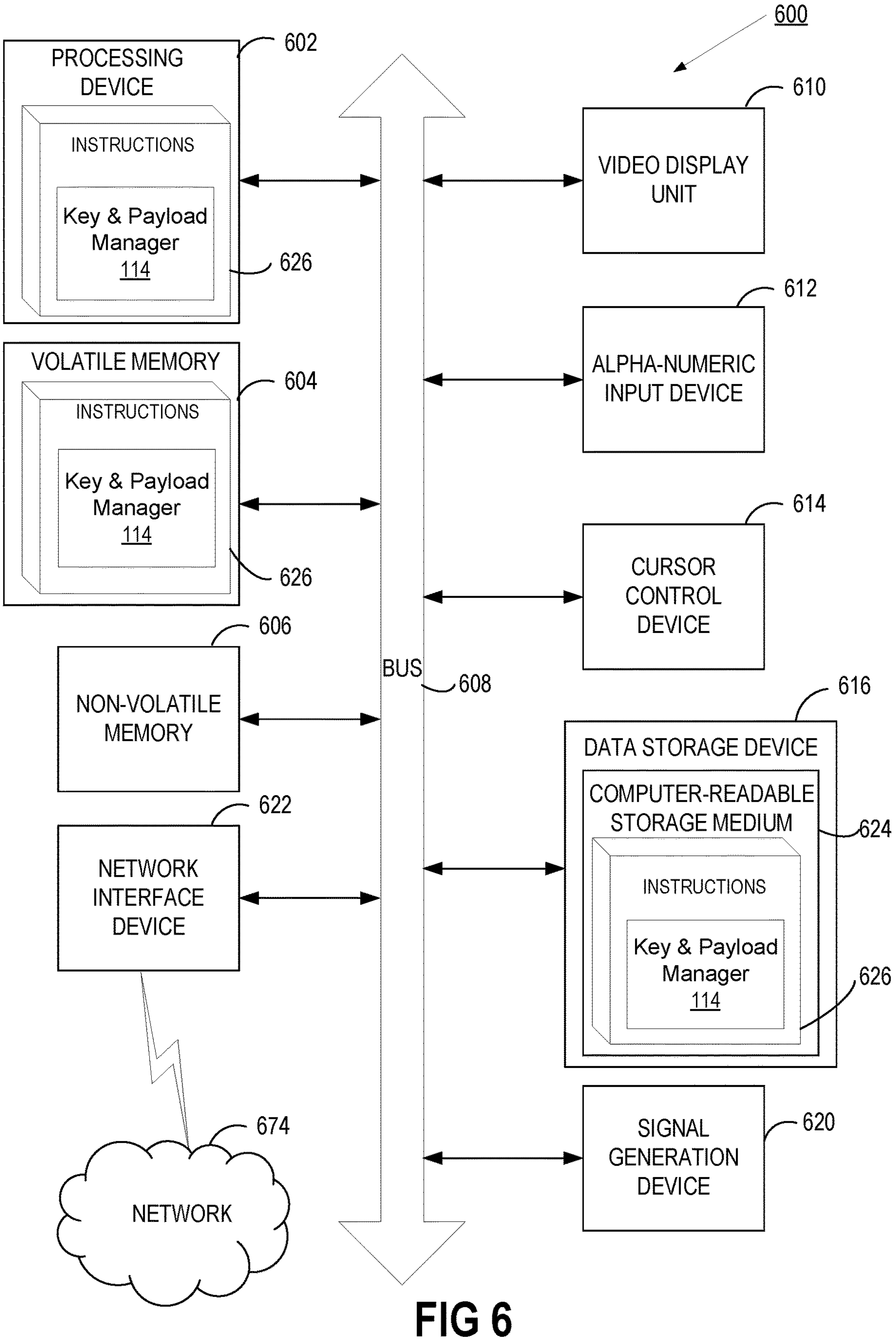
FIG. 6 depicts a block diagram of an illustrative computing device operating in accordance with examples of the present disclosure.

FIG. 6 depicts a block diagram of a computer system operating in accordance with one or more aspects of the present disclosure. In various illustrative examples, computer system 600 may correspond to computing device 100 of FIG. 1 and computing device 200 of FIG. 200. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 includes a processing device 602, a memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

Data storage device 616 may include a non-transitory computer-readable storage medium 624 on which may store instructions 626 encoding any one or more of the methods or functions described herein, including instructions for implementing method 300 or 400 and for encoding components implemented on FIG. 1 and FIG. 6.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 or 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

storing, by a processing device of an enterprise messaging system comprising a plurality of nodes, a message payload in a data store, wherein the data store is shared by the plurality of nodes, wherein the message payload is extracted from a message based on a size of the message payload exceeding a size of a metadata item associated with the message;

sending, to a first node of the plurality of nodes, the metadata item associated with the message;

responsive to determining that a key corresponding to the message payload has been used by the first node to retrieve the message payload from the data store, decrementing a removal counter associated with the key;

detecting a triggering event, wherein the triggering event comprises a queue associated with the data store satisfying a queue threshold criterion, and wherein satisfying the queue threshold criterion comprises a quantity of message payloads waiting in the queue exceeding a threshold quantity of message payloads; and responsive to determining that the removal counter satisfies a removal threshold criterion and detecting the triggering event, removing the message payload from the data store, wherein removing the message payload from the data store comprises:

placing an identifier of the message payload in a removal candidate pool;

selecting, based on a removal policy, a first message payload from the removal candidate pool, wherein the removal policy comprises a least recently used (LRU) rule or a least frequently used (LFU) rule; and removing the first message payload from the data store.

2. The method of claim 1, further comprising:

receiving, from the first node, a request to retrieve the message payload;

identifying the key corresponding to the message payload; and sending the key to the first node.

3. The method of claim 1, further comprising:

compressing the key.

4. The method of claim 3, further comprising:

subsequent to compressing the key, storing, in a data structure, the key corresponding to the message payload and the removal counter associated with the key.

5. The method of claim 1, further comprising:

determining that the key corresponding to the message payload has been borrowed by a second node of the plurality of nodes; and responsive to determining that the key has been borrowed by the second node, decrementing a borrow counter associated with the key.

6. The method of claim 1, further comprising:

determining that the key corresponding to the message payload has been returned by a second node of the plurality of nodes; and responsive to determining that the key has been returned by the second node, incrementing a borrow counter associated with the key.

7. The method of claim 1, further comprising:

responsive to determining that the removal counter does not satisfy the removal threshold criterion and that a borrow counter associated with the key satisfies a borrow threshold criterion, rendering the key unavailable.

8. The method of claim 1, wherein the enterprise messaging system further comprises a shared bus, and wherein sending the metadata item associated with the message to the first node of the plurality of nodes comprises:

sending, to the first node of the plurality of nodes, the metadata item associated with the message via the shared bus.

9. A system comprising:

a memory device; and a processing device operatively coupled to the memory device, to perform operations comprising:

storing a message payload in a data store, wherein the data store is shared by a plurality of nodes of an enterprise messaging system, wherein the message payload is extracted from a message based on a size of the message payload exceeding a size of a metadata item associated with the message;

sending, to a first node of the plurality of nodes, the metadata item associated with the message;

responsive to determining that a key corresponding to the message payload has been used by the first node to retrieve the message payload from the data store, decrementing a removal counter associated with the key;

detecting a triggering event, wherein the triggering event comprises a queue associated with the data store satisfying a queue threshold criterion, and wherein satisfying the queue threshold criterion comprises a quantity of message payloads waiting in the queue exceeding a threshold quantity of message payloads; and responsive to determining that the removal counter satisfies a removal threshold criterion and detecting the triggering event, removing the message payload from the data store, wherein removing the message payload from the data store comprises:

placing an identifier of the message payload in a removal candidate pool;

selecting, based on a removal policy, a first message payload from the removal candidate pool, wherein the removal policy comprises a least recently used (LRU) rule or a least frequently used (LFU) rule; and removing the first message payload from the data store.

10. The system of claim 9, wherein the operations further comprise:

receiving, from the first node, a request to retrieve the message payload;

identifying the key corresponding to the message payload; and sending the key to the first node.

11. The system of claim 9, wherein the operations further comprise:

compressing the key.

12. The system of claim 11, wherein the operations further comprise:

subsequent to compressing the key, storing, in a data structure, the key corresponding to the message payload and the removal counter associated with the key.

13. The system of claim 9, wherein the operations further comprise:

determining that the key corresponding to the message payload has been borrowed by a second node of the plurality of nodes; and responsive to determining that the key has been borrowed by the second node, decrementing a borrow counter associated with the key.

14. The system of claim 9, wherein the operations further comprise:

determining that the key corresponding to the message payload has been returned by a second node of the plurality of nodes; and responsive to determining that the key has been returned by the second node, incrementing a borrow counter associated with the key.

15. The system of claim 9, wherein the operations further comprise:

responsive to determining that the removal counter does not satisfy the removal threshold criterion and that a borrow counter associated with the key satisfies a borrow threshold criterion, rendering the key unavailable.

16. A non-transitory machine-readable storage medium including instructions that, when accessed by a processing device, cause the processing device to perform operations comprising:

storing a message payload in a data store, wherein the data store is shared by a plurality of nodes of an enterprise messaging system, wherein the message payload is extracted from a message based on a size of the message payload exceeding a size of a metadata item associated with the message;

sending, to a first node of the plurality of nodes, the metadata item associated with the message;

responsive to determining that a key corresponding to the message payload has been used by the first node to retrieve the message payload from the data store, decrementing a removal counter associated with the key;

detecting a triggering event, wherein the triggering event comprises a queue associated with the data store satisfying a queue threshold criterion, and wherein satisfying the queue threshold criterion comprises a quantity of message payloads waiting in the queue exceeding a threshold quantity of message payloads; and responsive to determining that the removal counter satisfies a removal threshold criterion and detecting the triggering event, removing the message payload from the data store, wherein removing the message payload from the data store comprises:

placing an identifier of the message payload in a removal candidate pool;

selecting, based on a removal policy, a first message payload from the removal candidate pool, wherein the removal policy comprises a least recently used (LRU) rule or a least frequently used (LFU) rule; and removing the first message payload from the data store.

* * * * *